July 25, 1967     D. B. PALL     3,332,557
WIRE MESH FILTER ELEMENT WITH ANCHORING RIM
Filed May 26, 1964
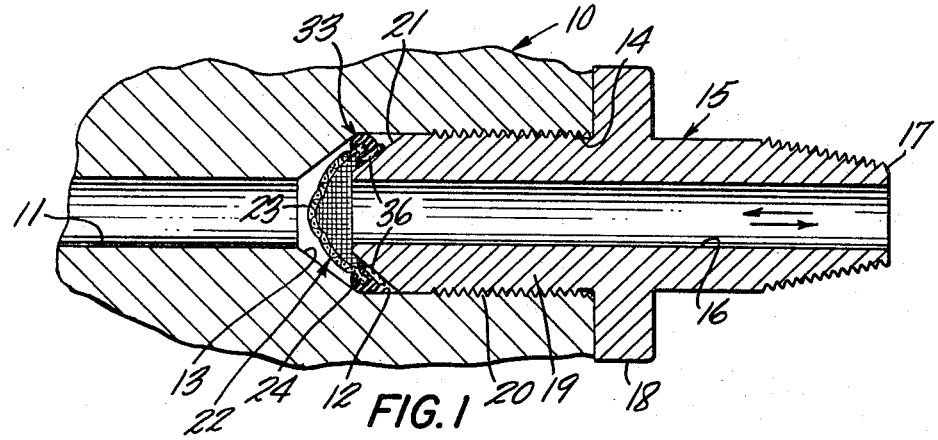
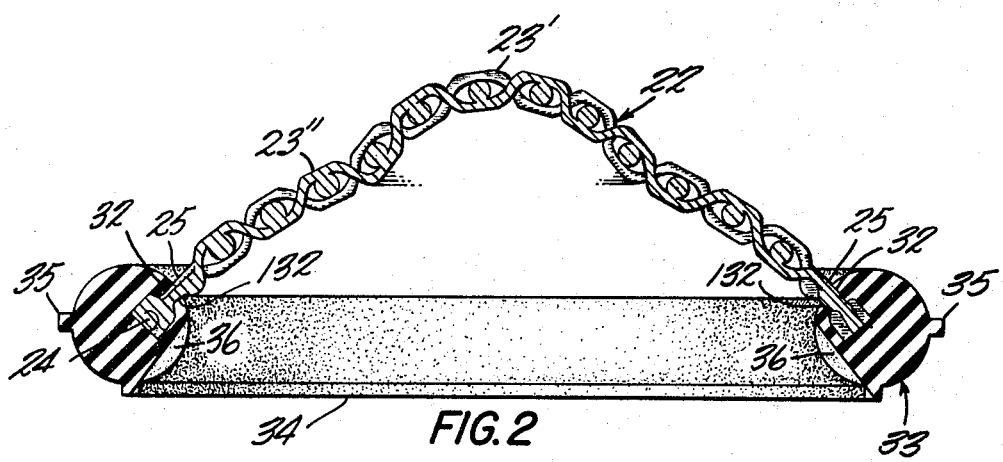
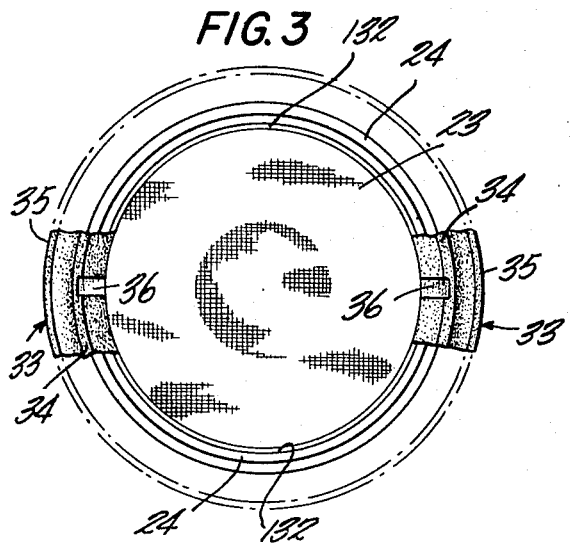
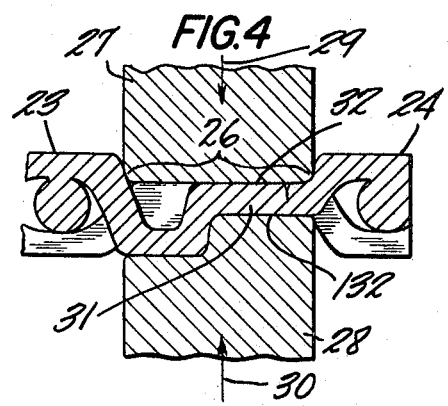

United States Patent Office 3,332,557
Patented July 25, 1967

3,332,557
WIRE MESH FILTER ELEMENT WITH ANCHORING RIM
David B. Pall, Roslyn Estates, N.Y., assignor to Pall Corporation, Glen Cove, N.Y., a corporation of New York
Filed May 26, 1964, Ser. No. 370,762
3 Claims. (Cl. 210—495)

This application is a continuation-in-part of application Ser. No. 270,173, filed July 16, 1962, now abandoned.

The present invention relates to a wire mesh or mesh-derived filter element having a marginal anchoring rim or gasket and a method of making it.

It has been previously proposed to provide a filter screen with a marginal anchoring rim or strip, the latter being in various forms of assembled layers or strips of different materials, which in some cases have been of gasketing or rubber composition. It has also been proposed to anchor the margins of such a screen in molded marginal strips of rubber by turning back the edges of the former upon themselves, to provide thickened edges embedded in the marginal strips for secure anchorage. However, some of such proposals have been expensive to produce, and others have been inferior in quality. Filter screens which are circular in outline are not adapted to the thickening of the marginal edge to serve as an anchoring rib to reverse turning thereof without undesirable distortion, tending to destroy a desired uniform filtering action thereof throughout all areas, or to produce an inferior anchorage in the marginal annulus in which it is embedded. Also, such circular screens may be of a construction which makes difficult such reverse turning for provision of this type of thickened anchorage edge.

The filter screen of the present invention readily overcomes these and other problems in a simple and economical manner. It makes possible the economical production of superior circular filter elements from wire mesh, in which the wire mesh may be of any type, such as that processed into sintered and deformed wire mesh by sintering and moderate pressure, or into perforate metallic sheet by sintering and rolling, both as described in my prior United States Patent No. 2,925,650, of Feb. 23, 1960. Whether of wire mesh or mesh-derived sheet, the marginal edge thereof is securely bonded to and embedded in an anchoring annulus, which may be of rubber or other suitable gasketing material also to serve as a gasket therefor.

The filter screen unit of the invention is particularly adapted to production in a dished form advantageous for use in the mounting of pipe fittings and in socketed and ducted bodies or companion fittings in a fluid-tight manner, with the location of the filter across the path of fluid flow. The invention further features a dished form of filter screen unit supportable in the fitting or socket in a manner to prevent distortion under high fluid pressures, employing a single or a double dished central portion for this purpose.

The filter element comprises a perforate metallic sheet of woven wire mesh having the marginal edge thereof provided with an embedding anchorage rib substantially of the thickness and structure of the stock of the filtering area of the element, and connected to the latter by an integral compressed zone or band of reduced thickness. The marginal anchorage rib is embedded in a strip, which is preferably molded thereabout and of suitable gasketing material, such as an elastic or rubber composition, and which extends into the zone or band of reduced thickness for interlocking bond thereto. The term "perforate metallic sheet" as used herein is inclusive of wire mesh and mesh-derived sheet such as sintered mesh and mesh rolled and sintered into perforate sheet form.

A preferred embodiment of filter element comprises a perforate metallic sheet of woven wire mesh in dished form having outer or peripheral dished portions to a radius of curvature such that these portions are supportable on a stop in the pipe fitting or other socketed or ducted body or companion fitting, and a central dished portion to a different radius of curvature, matching the open area of the pipe fitting or other body, across the path of fluid flow therethrough.

For a fuller understanding of the invention, reference should be had to the accompanying drawings, in which:

FIG. 1 is an axial section, with parts broken away, of a typical filter unit mounting of an embodiment in circular form of a filter element of the present invention;

FIG. 2 is an enlarged transverse section of the filter element shown in FIG. 1;

FIG. 3 is a plan view of the circular perforate sheet of woven wire mesh stock after the formation of the annular compressed zone therein, such as in the manner illustrated in FIG. 4, and showing portions of a gasketing ring molded thereon;

FIG. 4 is a detailed sectional view to exaggerated scale of an edge portion of the perforate sheet of woven wire mesh embodied in the filter element of FIGS. 1 and 2, illustrating the means for deforming this portion to define therein a marginal anchorage rib and the connecting zone intervening the rib and the filtering area.

In the drawing, like numerals identify similar parts throughout.

The assembly illustrated in FIG. 1 includes, by way of example, a ducted body 10 having a flow bore 11 counterbored at 12 to provide an annular oblique seat 13. Counterbore 12 is provided with a section of internal female threads 14. A connecting fitting 15, which may be in the form of a tubular body having a through bore 16, has an externally threaded nipple end 17, an annular seating flange 18 and an inner externally threaded end 19. The inner end 19 of the fitting 15 is provided with external male threads 20 threadably engaged with the female threads 14 of the body 10 and has an oblique annular end surface 21 opposed to the oblique annular seat 13. A filter element 22 of the present invention is located between the oblique surfaces 13 and 21, so that the central filtering area thereof extends across the path of flow through the aligned ducts or passages 11 and 16.

As will be seen from FIGS. 1 and 2, the filter element 22 includes a dished disk 23 of woven wire mesh stock, which preferably is the perforate metallic sheet material described and claimed in my above-identified prior patent. The dished disk has two portions of different radii of curvature, a central portion 23' which is preferably a hemisphere or a portion of a hemisphere with a relatively small radius of curvature, and an outer or peripheral portion 23" with a larger radius of curvature. Special conditions may be required that the dished disk be oblate or ovoid. As is best seen in FIG. 1, the central portion 23' corresponds approximately in radius to the open area of the duct or passage 11, and the outer or peripheral portion 23" matches the oblique annular seat 13 which thus serves as a support for this portion of the screen. However, depending on the angles of seat 13 and surface 21, the diameters of bores 11 and 16, the working pressure, and other factors which will be apparent to those skilled in the art, it may be desirable to make the radius of central portion 23' smaller than bore 11 or 16, say as small as 70% of the radius of the bore, or larger than the radius of the bore.

The marginal edge of the disk 23 is provided with an annular anchorage rib 24 which is substantially of the character of the stock of the central filtering area thereof, extending to a circular line of connection at 25. An integral compressed zone 26, of annular outline, is provided in reduced thickness, so as to connect the annular rib 24 to the central filtering area of the dished disk 23.

As is illustrated in FIG. 4 the integral compressed zone 26 which annularly connects the circular marginal rib 24 to the main central body of the disk 23 may be formed by arranging against opposite faces of the latter circular dies 27 and 28 which, when forced toward each other in the direction of the opposed arrows 29 and 30, compress the woven wire mesh stock at 31 within the annular zone 26. As a result, aligned annular grooves 31 and 132, indicated in FIGS. 2, 3 and 4, are provide in the opposite faces o fthe disk 23, to define therebeyond the annular anchorage edge rib 24. The application of the opposed compressing forces by the opposed dies 27 and 28 to form the integral compressed zone of reduced thickness 26 may be accompanied by the application of heat to facilitate the deformation and crushing. It will be understood that in the formation of the integral connecting compressed zone of reduced thickness at 26 there is no undue distortion of the character of the stock within the filtering area inward of this zone.

A marginal anchoring strip of greater thickness than the stock of the perforate sheet of woven wire mesh, preferably in the form of a torus 33, is applied to the ribbed edge of the disk 23. This torus 33 may be in the form of a molded ring of gasketing composition, such as rubber, in which the annular anchorage rib 24 is embedded. The material of the molded anchorage annulus 33 completely covers the anchorage rib 24 and extends into the grooves 32 and 132 formed in the zone 26 of reduced thickness, thereby providing a secure interlocking bond.

An embodiment of the present filter element may have the annular anchoring strip 33 provided with an annular, axially-extending rib 34 and another annular, radially-extending outside rib 35, which may be molded integral therewith. It may also be desirable to interrupt the surface of one side of the annular anchoring strip 33, when this torus is to serve as a gasketing ring, so as to avoid a double seal for preventing damage thereto in certain service. Such interruption may be provided by a diametrically-opposed pair, or more, of oblique relief grooves 36.

When the filter element of the present invention, which is illustrated at 22 by way of example in the drawing, is inserted in the counterbore 12 to seat its annular anchorage ring 33 against the annular seat 13 and the fitting 15 is screwed tightly into the counterbore, the gasketing anchoring ring may be clamped in a fluid tight manner between this seat and the annular oblique end surface 21 of the fitting or may be left loose to move between seat 13 and fitting 15 as flow direction changes.

It will thus be seen that in operation, when fluid is flowed in passage 16 in the direction of the disk to emerge in passage 11, the disk can stretch under the fluid pressure but distortion is prevented due to the fact that the outer peripheral portions 23″ encounter the oblique seat 13 and are supported thereby, right up to the edges of the passage 11. At this point the screen has a smaller radius of curvature 23′ and is better able to withstand the high fluid pressure. It will readily be seen that the radius chosen for the central dished portion 23′ will depend upon the fluid pressures to be resisted and the material of which the mesh is constructed, that is, the strength or resistance to distortion of this material, as well as the diameter of the passage 11, the pressure differential across the disk, and the thickness of the disk. Those skilled in the art will readily perceive how to design the dished portion 23′ in view of these parameters.

I claim:
1. A filter element for use in a fluid line having a filter seat formed therein, comprising, in combination, a dished filter sheet of woven wire mesh having an outer dished portion and an inner dished portion, both portions being dished in the same direction and normally spaced from the filter seat; a marginal annular anchorage rib; an annular zone adjacent thereto, compressed to reduce thickness; an annular resilient sealing ring at the periphery of the mesh sheet enclosing the anchorage rib and the compressed zone; said inner dished portion having a radius of curvature that is less than the radius of curvature of the outer portion, and having a diameter that corresponds approximately to the diameter of the fluid line; the outer dished portion being disposed to resist fluid pressures in one direction and being adapted to seat against the filter seat in the fluid line under deforming fluid pressures in the opposite direction, thereby assisting the inner dished portion in resisting deformation under such fluid pressures.

2. A filter element as defined in claim 1 in which said sealing ring is of molded resilient material.

3. A filter element in accordance with claim 1 in which the radius of the inner dished portion is greater than 70% of the radius of the fluid line.

References Cited
UNITED STATES PATENTS

| | | | |
|---|---|---|---|
| 1,289,512 | 12/1918 | Minard | 210—497 X |
| 1,688,401 | 10/1928 | Slagel | 210—448 X |
| 1,832,776 | 11/1931 | Hudson | 210—448 X |
| 2,127,397 | 8/1938 | Freedlander | 210—495 |
| 2,153,664 | 4/1939 | Freelander | 210—495 |
| 2,316,526 | 4/1943 | McDonald | 210—495 X |
| 2,391,215 | 12/1945 | Zabel et al. | 210—495 |
| 3,082,587 | 3/1963 | Brimberg | 210—495 X |

FOREIGN PATENTS 103,207 4/1926 Austria.

REUBEN FRIEDMAN, *Primary Examiner.*
C. M. DITLOW, *Assistant Examiner.*